United States Patent
Hua et al.

(10) Patent No.: US 8,223,947 B2
(45) Date of Patent: Jul. 17, 2012

(54) METHOD AND SYSTEM FOR REMOTE CALL FORWARDING SET-UP AND MODIFICATION

(75) Inventors: Suzann Hua, Lisle, IL (US); Ahmed Zaki, Lisle, IL (US)

(73) Assignee: Alcatel Lucent, Paris (FR)

( * ) Notice: Subject to any disclaimer, the term of this patent is extended or adjusted under 35 U.S.C. 154(b) by 32 days.

(21) Appl. No.: 12/635,814

(22) Filed: Dec. 11, 2009

(65) Prior Publication Data

US 2011/0142223 A1    Jun. 16, 2011

(51) Int. Cl.
*G06F 15/16* (2006.01)
(52) U.S. Cl. .................. 379/211.02; 455/412.1
(58) Field of Classification Search .......... 455/412.1, 455/412.2, 414.1, 419; 379/211.02
See application file for complete search history.

(56) References Cited

U.S. PATENT DOCUMENTS 5,794,142 A * 8/1998 Vanttila et al. ............... 455/419
7,450,935 B1 * 11/2008 Link et al. .................... 455/417

* cited by examiner

*Primary Examiner* — Sam Bhattacharya
(74) *Attorney, Agent, or Firm* — Fay Sharpe LLP

(57) ABSTRACT

This invention proposes providing support for remote call forwarding set-up for IP desk phones via messaging. Whenever a user wants to set-up or change call forwarding for his/her IP desk phone, the user can send a Short Message (SM) to user's IP desk phone. The user can send such call forwarding set-up/change SM via user's mobile phone or from any internet connected e-mail system. With this approach, the user can set-up the call forwarding for his/her IP desk phone anytime, anywhere and with immediate effect.

18 Claims, 2 Drawing Sheets

METHOD AND SYSTEM FOR REMOTE CALL FORWARDING SET-UP AND MODIFICATION

FIELD OF THE EMBODIMENTS OF THE INVENTION

This invention relates to a method and system for remote call forwarding set-up and modification for Internet Protocol (IP) phone systems. This is accomplished, in at least one form via messaging, e.g. short messages (SM).

BACKGROUND OF THE INVENTION

Internet Protocol (IP) phones are getting increasingly popular for both business and residential usages. As personal life and working environments become more dynamic, the need to remotely perform set-up and modification of service features, such as set-up and modification of a call forwarding feature for an IP phone becomes highly desirable. For example, if a user has an IP desk phone at home or office, the user may wish to set-up or change call forwarding features while the user is physically out of the home or office. However, such remote Call Forwarding set-up and modification features are still not available for IP desk phone systems.

In this regard, with today's IP desk phone, a user can generally only set-up call forwarding by using the buttons on the phone. If the user is not in physical proximity to the IP phone, the user must call the service provider (e.g. service provider help desk) to set-up or change the call forwarding features. Since such remote call forwarding set-up and modification occurs via a third party and without an automatic procedure, the execution of the set-up/change order can be delayed.

SUMMARY

A method and system for remote call forwarding set-up and/or modification for IP phones via messaging are provided.

In one aspect, an Internet Protocol (IP) phone system comprises a recognition module operative to receive short messages and recognize specific codes (or special text) within the short messages related to Gall forwarding features of the phone, a call forwarding feature module operative to have stored therein information on the call forwarding features based on the codes, and, a control module operative to store the information on the call forwarding features in the call forwarding feature module, control the call forwarding features of the phone according to the information and process incoming calls according to the stored information.

In another aspect, the codes comprise codes for call forwarding set-up or modification.

In another aspect, the codes comprise codes for a call forward to number condition.

In another aspect, the call forward to number condition indicates an unconditional call forwarding number.

In another aspect, the call forward to number condition indicates a call forwarding number at no answer condition.

In another aspect, the codes comprise a code for a call party number condition.

In another aspect, the codes comprise codes for a call party name condition.

In another aspect, the recognition module is further operative to recognize an empty message and the control module is operative to delete previous call forward feature information from the call forwarding feature module based on the empty message.

In another aspect, the codes comprise text or text formats.

In another aspect, a method comprises receiving short messages by the phone, recognizing codes within the short messages related to call forwarding features of the phone, storing information on the call forwarding features based on the recognized codes, and, processing incoming calls based on the stored call forwarding feature information.

In another aspect, the codes comprise codes for call forwarding set-up or modification.

In another aspect, the codes comprise codes for a call forward to number condition.

In another aspect, the call forward to number condition comprises an unconditional call forwarding number.

In another aspect, the call forward to number condition comprises a call forwarding number at no answer condition.

In another aspect, the codes comprise codes for a call party number condition.

In another aspect, the codes comprise codes for a call party name condition.

In another aspect, the method further comprises recognizing an empty message and deleting previous call forward information based on the empty message.

In another aspect, the codes comprise text or text formats.

Further scope of the applicability of the presently described embodiments will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION

IP desk phones are typically associated with an IP address. As a result, most IP phones are able to process/handle text messages. The presently described embodiments capitalize on this functionality to support remote call forwarding set-up or modification for IP desk phones via a Short Message (SM). The user may send a short message (SM) to an IP desk phone to set-up/change call forwarding, and/or the SM may be sent via the mobile phone of the user or from a computer e-mail system.

So, more particularly, the presently described embodiments provide support for remote call forwarding set-up and modification for IP desk phones via messaging. When a user wishes to set-up or change call forwarding for his/her IP desk phone, the user can send a Short Message (SM) to the IP desk phone. The user can send such a call forwarding set-up/change short message (SM) via a mobile phone of the user or from any internet connected e-mail system. With this approach, the user can set-up or change the call forwarding for his/her IP desk phone anytime, anywhere and with immediate effect.

Figure 1:
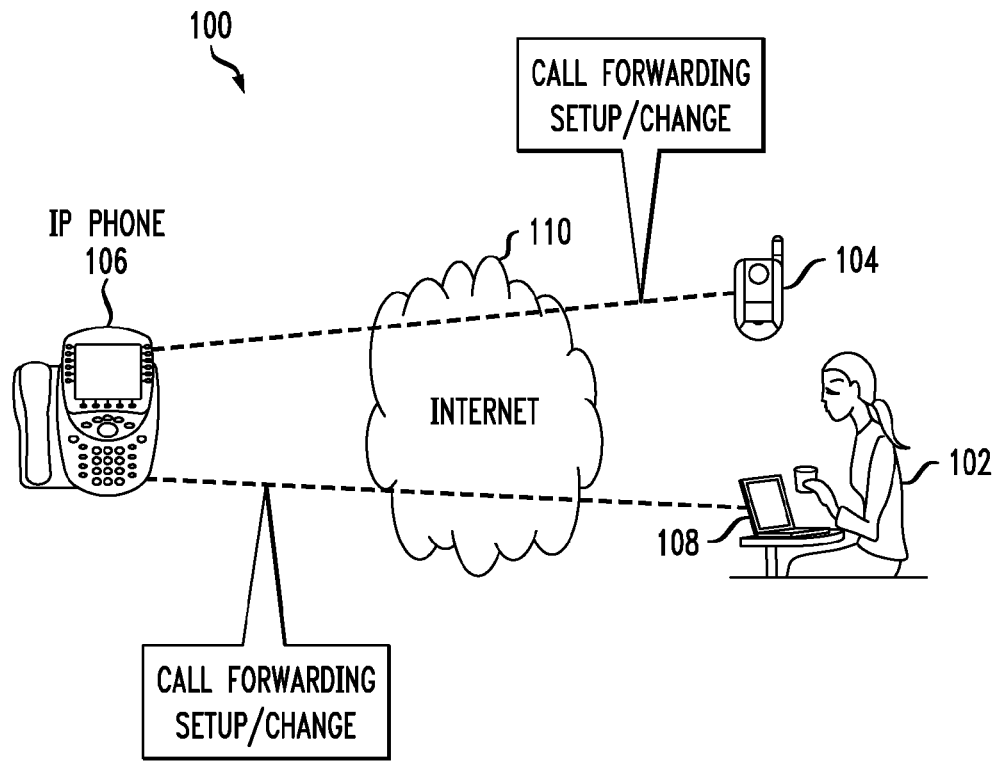
FIG. 1 is an illustration of a portion of a network implementing the presently described embodiments.

Referring now to the drawings wherein the showings are for purposes of illustrating the exemplary embodiments only and not for purposes of limiting the claimed subject matter, FIG. 1 provides a view of a system 100 into which the presently described embodiments may be incorporated. As shown generally, FIG. 1 shows an overview of a Remote Call Forwarding set-up/change process for IP phone via messaging. With this approach, a user 102 can use mobile phone 104 to send a short message (SM) to an IP phone 106 of the user to set-up/change the call forwarding feature, or the user 102 can use any internet connected e-mail system 108 to send short messages (SM) to the IP phone to set-up/change the call forwarding. Of course, these transactions will be completed in or supported by an appropriate network 110.

According to the presently described embodiments, the service provider assigns each IP desk phone, such as phone 106, with a messaging address such as phone-number@domain, where the domain can be service provider's domain. For example, if an IP phone 106 has phone number 630-123-4567 that is offered via AT&T, this phone's messaging address can be 6301234567@att.net.

The service provider may also provide web site/link for user 102 to sign-up for the remote call forwarding (CF) set-up service, which may be charged for a certain amount of monthly fee. This website may also be used to send short messages (SM) by the user to the subject IP phone for call forwarding set-up or modification.

According to the presently described embodiments, the short message (SM) software in the IP phone is enhanced to achieve the following objectives:

1) Recognize the specific or special text or code designated for the remote CF set-up service, for example, "CF SETUP". This code or text may be included as the first text in the message or, where suitable, within the subject line of the message.

2) Recognize the specific or special text content/format or code for call forward to number, for example, UCF=phone number (indicating unconditional call forwarding number) or CFNA=phone-number (indicating call forwarding number at no answer condition).

3) Recognize the specific or special text content/format or code for call party number condition, for example, CLNU=xxxxx (indicating the call forwarding will be applied to the call party number that contains the xxxxx).

4) Recognize the specific or special text content/format or code for call party name condition, for example, CLNA=yyyyy (indicating the call forwarding will be applied to the call party name that contains the yyyyy string).

5) Store the received set-up immediately.

6) Act upon accordingly whenever a call is received.

7) Whenever a new short message (SM) message is received, the new call forwarding set-up will overwrite the corresponding old call forwarding set-up.

8) If a new call forwarding set-up message is received with empty content, any existing call forwarding set-up will be removed.

It will be appreciated that the IP phones may be modified to support any combination of items 2), 3), 4) and 8). Also, the IP phone should treat such call forwarding set-up short message processing as part of a Call Forwarding processing enhancement. In addition, it should be appreciated that the specific or special text or text content/format or codes contemplated by the presently described embodiments may take a variety of forms including that of various characters or text, or character or text strings. The code or text may also be defined by a specific form or format that may be recognized by the subject system.

Figure 2:
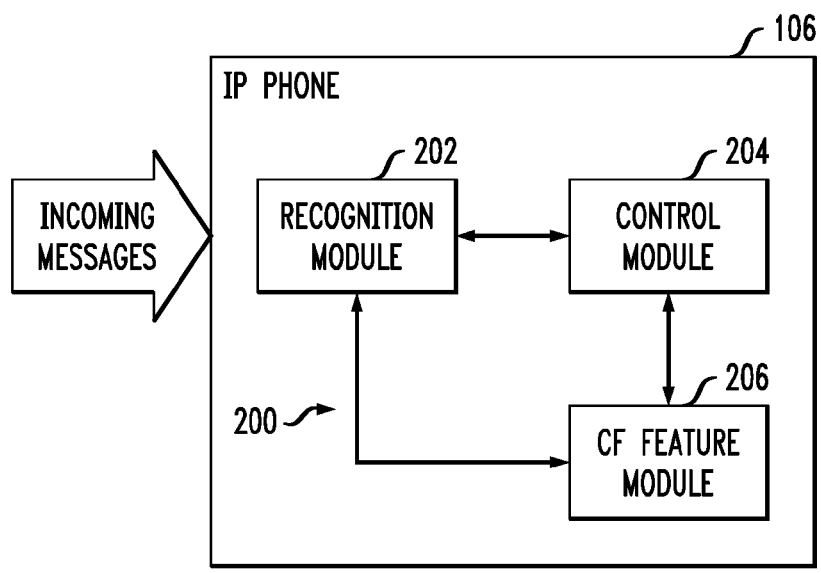
FIG. 2 is an illustration of a portion of an IP phone according to the presently described embodiments.

With reference now to FIG. 2, in this regard and in one form, the IP phone 106 includes an enhancement portion 200. It should be appreciated that the other components of the IP phone are not shown for ease of reference. Only those components described herein are shown.

Figure 3:
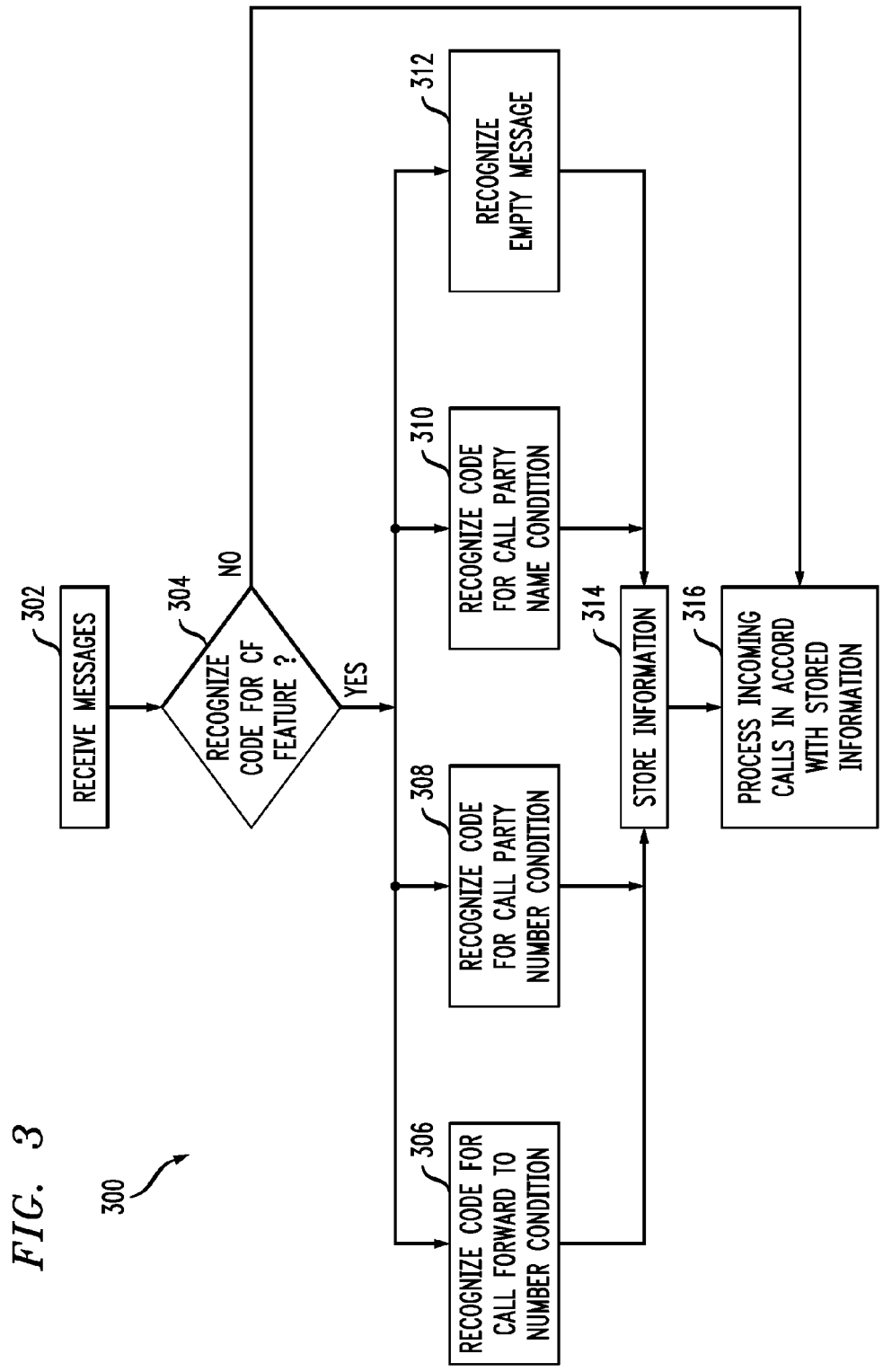
FIG. 3 is a flow chart illustrating a method according to the presently described embodiments.

As shown, the enhancement portion 200 includes a recognition module 202 that receives incoming messages to the IP phone 106 and performs various recognition functions on the messages, as is described in greater detail above and in connection with FIG. 3. It will be appreciated that the recognition module may act in combination with or as an enhancement to the existing modules for processing short messages (SMs) that may exist on various IP phones. The recognition module 202 may also be a stand-along module or routine integrated into the IP phone, whether or not the system otherwise includes short message capability.

Also shown is a control module 204 that is operative to act in conjunction with the recognition module 202 to store data relating to the various call forwarding features that are set-up or modified as may be dictated by the contents of the messages recognized by the recognition module 202. The control module 204 is also operative to control the call forwarding features according to the codes or information related to the codes and operative to process incoming calls based on stored call forwarding features. It should be appreciated that information on the call forwarding features (or the codes themselves) may be maintained in a module 206 as shown or in other suitable storage locations on the IP phone.

In operation, the recognition module 202 is operative to recognize the special text or codes in a message designated for remote call forwarding set-up service, recognize text content/format or codes for call forward to number functions, recognize special text content/format or codes for call party number conditions and recognize special text content/format or codes for call party name conditions that may be contained in the messages received by the software enhancement 200. In addition, the recognition module 202 is operative to recognize when a message is empty, whereby any existing call forwarding settings or parameters are removed by the software enhancement 200.

The control module 204 is operative to receive information from the recognition module 202. In addition, the control module 204 facilitates the storage of information in the call forwarding features module 206 to allow for maintenance of the call forwarding features dictated by the content of the incoming messages. Of course, the call forwarding feature module 206 may take a variety of forms, including that of merely a storage area or register to store data that can be accessed by the IP phone 106 upon processing of incoming calls—to the extent call forwarding features are implemented.

It should be appreciated that the enhancement module 200 may take a variety of forms and be implemented using a variety of hardware configurations and/or software techniques. Likewise, methods according to the presently described embodiments implementing these features may also take a variety of forms.

For example, with reference to FIG. 3, an example method 300 may be implemented. In this regard, messages are received by the IP phone 106 (at 302). The recognition module then determines whether the message includes the appropriate code for remote service set-up (at 304). If not, incoming calls are merely processed in accord with already stored feature data (at 316). If, however, the code for the remote service set-up feature is recognized (at 302), it is determined by the recognition module 202 whether other codes within the message are recognized. For example, it is determined whether the text or code for a call forwarding to number condition is recognized (at 306). It is determined whether the text or code for a call party number condition is recognized (at 308). It is determined whether the code for call party name condition is recognized (at 310). It is also determined whether the message has no content (at 312). In any or all cases, the code that is recognized is then used to store appropriate set-up or modification information in the call forward feature module 206 (at 314). Incoming calls are then processed according to the stored features (at 316).

A person of skill in the art would readily recognize that steps of various above-described methods can be performed by programmed computers. Herein, some embodiments are also intended to cover program storage devices, e.g. digital data storage media, which are machine or computer readable and encode machine-executable or computer-executable programs of instructions, wherein said instructions perform some or all of the steps of said above-described methods. The program storage devices may be, e.g. digital memories, magnetic storage media such as magnetic disks and magnetic tapes, hard drives, or optically readable digital data storage media. The embodiments are also intended to cover computers programmed to perform said steps of the above-described embodiments.

It should also be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. An Internet Protocol (IP) phone system comprising:
   a recognition module operative to receive short messages and recognize codes within the short messages related to call forwarding features of the IP phone system;
   a call forwarding feature module operative to have stored therein information on the call forwarding features based on the codes; and,
   a control module operative to store the information on the call forwarding features in the call forwarding feature module, control the call forwarding features of the IP phone system according to the information and process incoming calls according to the stored information.

2. The system as set forth in claim 1 wherein the codes comprise codes for call forwarding set-up or modification.

3. The system as set forth in claim 1 wherein the codes comprise codes for a call forward to number condition.

4. The system as set forth in claim 3 wherein the call forward to number condition indicates an unconditional call forwarding number.

5. The system as set forth in claim 3 wherein the call forward to number condition indicates a call forwarding number at no answer condition.

6. The system as set forth in claim 1 wherein the codes comprise a code for a call party number condition.

7. The system as set forth in claim 1 wherein the codes comprise codes for a call party name condition.

8. The system as set forth in claim 1 wherein the recognition module is further operative to recognize an empty message and the control module is operative to delete previous call forward feature information from the call forwarding feature module based on the empty message.

9. The system as set forth in claim 1 wherein the codes comprise text or text formats.

10. A method for remote control of call forwarding features in an Internet Protocol (IP) phone, the method comprising:
    receiving short messages by the IP phone;
    recognizing codes within the short messages related to call forwarding features of the IP phone;
    storing information on the call forwarding features based on the recognized codes; and,
    processing incoming calls based on the stored call forwarding feature information.

11. The method as set forth in claim 10 wherein the codes comprise codes for call forwarding set-up or modification.

12. The method as set forth in claim 10 wherein the codes comprise codes for a call forward to number condition.

13. The method as set forth in claim 12 wherein the call forward to number condition comprises an unconditional call forwarding number.

14. The method as set forth in claim 12 wherein the call forward to number condition comprises a call forwarding number at no answer condition.

15. The method as set forth in claim 10 wherein the codes comprise codes for a call party number condition.

16. The method as set forth in claim 10 wherein the codes comprise codes for a call party name condition.

17. The method as set forth in claim 10 further comprising recognizing an empty message and deleting previous call forward information based on the empty message.

18. The method as set forth in claim 10 wherein the codes comprise text or text formats.

* * * * *